(12) United States Patent
Klein et al.

(10) Patent No.: US 8,665,928 B1
(45) Date of Patent: Mar. 4, 2014

(54) CIRCUIT FOR GENERATING AN OUTPUT CLOCK SIGNAL SYNCHRONIZED TO AN INPUT CLOCK SIGNAL

(75) Inventors: Matthew H. Klein, Redwood City, CA (US); David F. Taylor, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 499 days.

(21) Appl. No.: 13/030,558

(22) Filed: Feb. 18, 2011

(51) Int. Cl.
  *H04B 3/36* (2006.01)
  *H04L 25/20* (2006.01)
  *H04L 25/52* (2006.01)
  *H03D 3/24* (2006.01)

(52) U.S. Cl.
  USPC ........... 375/211; 375/362; 375/371; 375/375; 375/376; 327/147; 327/156

(58) Field of Classification Search
  USPC .................. 375/211, 354, 362, 371–376; 327/147–163; 708/313, 847
  See application file for complete search history.

(56) References Cited

U.S. PATENT DOCUMENTS 7,782,927 B2 * 8/2010 Borker et al. ............... 375/220
2006/0227917 A1 * 10/2006 Buchwald et al. ........... 375/355

OTHER PUBLICATIONS

Pagiamtzis, Kostas, *ECE1352 Analog Integrated Circuits Reading Assignment: Phase Interpolating Circuits*, Nov. 12, 2001, pp. 1-20.

* cited by examiner

*Primary Examiner* — Curtis Odom
(74) *Attorney, Agent, or Firm* — LeRoy D. Maunu

(57) ABSTRACT

A circuit generates an output clock signal synchronized to an input clock signal. The circuit includes a reference clock port, a phase interpolator, and a phase controller. The reference clock port receives a reference clock signal. The phase interpolator generates the output clock signal that, as a function of a variable control value, is an interpolation between two reference phases. The reference phases are generated from the reference clock signal and have a reference frequency. The phase controller generates the variable control value providing a phase rotation rate. An output frequency of the output clock signal equals a sum of the reference frequency and the phase rotation rate. The output frequency matches an input frequency of the input clock signal.

15 Claims, 3 Drawing Sheets

CIRCUIT FOR GENERATING AN OUTPUT CLOCK SIGNAL SYNCHRONIZED TO AN INPUT CLOCK SIGNAL

FIELD OF THE INVENTION

One or more embodiments generally relate to clock synthesis, and more particularly to frequency-tunable clock synthesis.

BACKGROUND

Variable frequency crystal oscillators can generate stable reference frequencies that are tunable over a limited range. Fixed frequency crystal oscillators are less expensive than variable frequency crystal oscillators, but generate stable reference frequencies that are not tunable. There is a general need to provide tunable reference frequencies and to lower implementation costs.

SUMMARY

In one embodiment, a circuit generates an output clock signal synchronized to an input clock signal. The circuit includes a reference clock port, a phase interpolator, and a phase controller. The reference clock port receives a reference clock signal. The phase interpolator generates the output clock signal that, as a function of a variable control value, is an interpolation between two reference phases. The reference phases are generated from the reference clock signal and have a reference frequency. The phase controller generates the variable control value providing a phase rotation rate. An output frequency of the output clock signal equals a sum of the reference frequency and the phase rotation rate. The output frequency matches an input frequency of the input clock signal.

In one embodiment, a circuit for clock synchronization includes a reference clock port and multiple clock synchronization circuits for generating respective output clock signals synchronized to respective input clock signals. The reference clock port receives a reference clock signal that has a first reference frequency. The first reference frequency divided by a first integer equals a second reference frequency divided by a second integer. Each clock synchronization circuit includes a phase interpolator and a phase controller. The phase interpolator generates the output clock signal that, as a function of a variable control value, is an interpolation between two reference phases. The reference phases are generated from the reference clock signal and have the second reference frequency. The phase controller generates the variable control value providing a phase rotation rate. An output frequency of the respective output clock signal equals a sum of the second reference frequency and the phase rotation rate. The output frequency matches an input frequency of the respective input clock signal.

In one embodiment, data repeater circuit includes a data receiver, a reference clock port, a phase interpolator, a phase controller, and a data transmitter. The data receiver recovers an input clock signal and a serial sequence of data bits received from a first communication link. The reference clock port receives a reference clock signal. The phase interpolator generates an output clock signal that, as a function of a variable control value, is an interpolation between two reference phases. The reference phases are generated from the reference clock signal and have a reference frequency. The phase controller generates the variable control value providing a phase rotation rate. An output frequency of the output clock signal equals a sum of the reference frequency and the phase rotation rate. The output frequency matches an input frequency of the input clock signal. The data transmitter transmits the serial sequence of data bits on a second communication link. The data transmitter transmits the serial sequence of data bits synchronized to the output clock signal.

It will be appreciated that various other embodiments are set forth in the Detailed Description and Claims which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Figure 1:
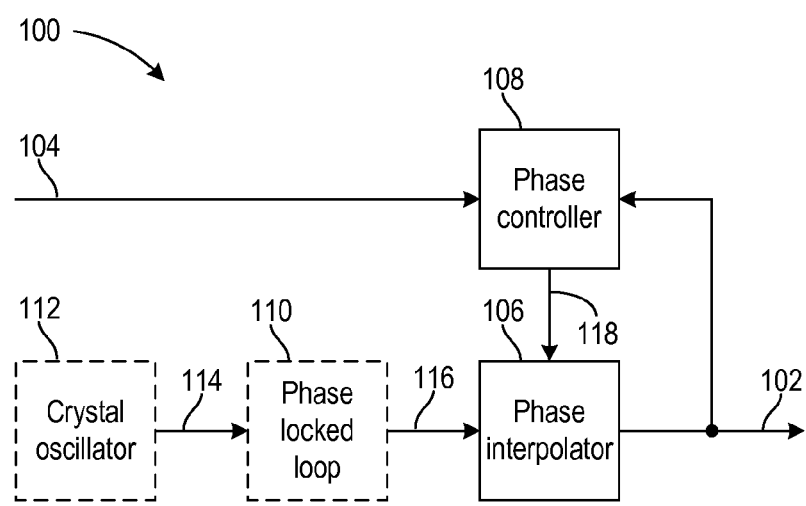
FIG. 1 is a block diagram of a circuit for generating an output clock signal synchronized to an input clock signal.

FIG. 1 is a block diagram of a circuit 100 for generating an output clock signal on line 102 that is synchronized to an input clock signal on line 104. The circuit 100 matches the output frequency of the output clock signal on line 102 to the input frequency of the input clock signal on line 104. The circuit 100 includes a phase interpolator 106, a phase controller 108, an optional phase-locked loop 110, and an optional crystal oscillator 112.

A reference clock port receives the reference clock signal on line 114, and reference phases having a reference frequency are generated from the reference clock signal on line 114. In an embodiment omitting the phase-locked loop 110, the phase interpolator 106 internally generates the reference phases from the reference clock signal on line 114, and the reference clock signal on line 114 and the reference phases have the reference frequency. In another embodiment, the optional phase-locked loop 110 generates a second reference clock signal on line 116 and the phase interpolator 106 internally generates the reference phases from the second reference clock signal on line 116. In this embodiment, the second reference clock signal on line 116 and the reference phases have the reference frequency that an integer ratio times a frequency of the reference clock signal on line 114. In yet another embodiment, the optional phase-locked loop 110 generates some or all of the reference phases from the reference clock signal on line 114, and these reference phases have the reference frequency that an integer ratio times a frequency of the reference clock signal on line 114. It will be appreciated that sources other than crystal oscillator 112 may generate the reference clock signal on line 114.

In one embodiment, the optional crystal oscillator 112 generates the reference clock signal on line 114. The crystal oscillator 112 either generates the reference clock signal at the reference frequency or the optional phase-locked loop 110 generates the reference frequency by multiplying the frequency from the crystal oscillator 112 by an integer ratio. A crystal oscillator 112 that generates a fixed frequency is inexpensive and provides a very stable reference frequency. In contrast, a variable crystal oscillator is more expensive and provides a stable frequency that is tunable over a limited range. The phase interpolator 106 and the phase controller 108 enable generation of a tunable and stable frequency from an inexpensive fixed-frequency crystal oscillator 112. Thus, the circuit 100 provides frequency tuning without the cost of a variable crystal oscillator.

The phase interpolator 106 generates the output clock signal on line 102 that interpolates between two of the reference phases as a function of a variable control value on line 118. The phase controller 108 generates the variable control value on line 118 that provides a phase rotation rate. The phase rotation rate of the variable control value on line 118 causes the phase interpolator 106 to generate the output clock signal on line 102 that has an output frequency that equals a sum of the reference frequency and the phase rotation rate. The phase controller 108 generates the variable control value on line 118 to tune the output frequency of the output clock signal on line 102 to match the input frequency of the input clock signal on line 104.

In one embodiment, the input clock signal on line 104 has a significant amount of input jitter. By primarily basing the output frequency of the output clock signal on line 102 on the frequency on line 114 from a stable crystal oscillator 112, the circuit 100 can generate the output clock signal on line 102 with an output jitter that is significantly less that the input jitter of the input clock signal on line 104.

Figure 2:
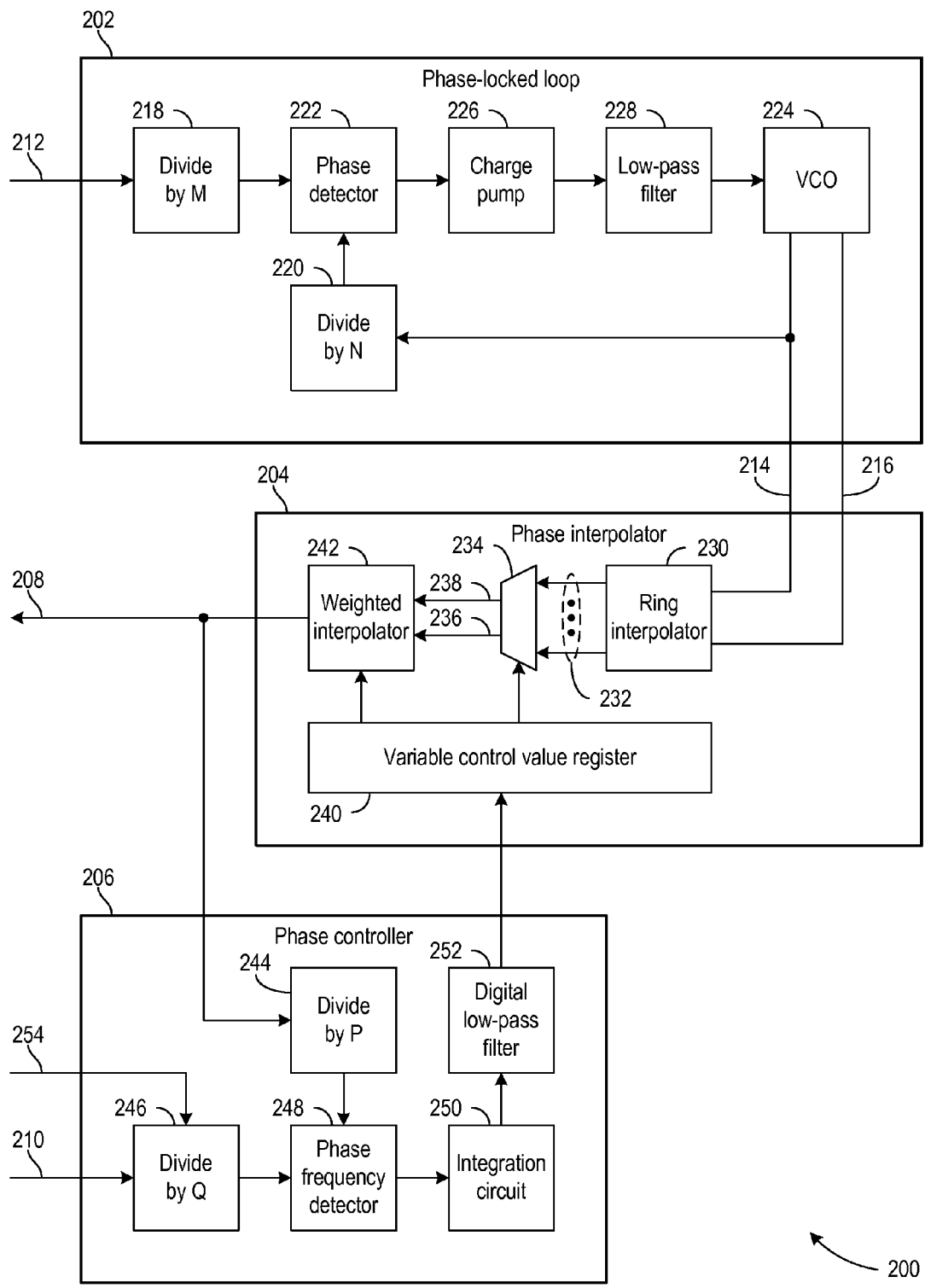
FIG. 2 is a block diagram of a circuit for clock synchronization.

FIG. 2 is a block diagram of a circuit 200 for clock synchronization. The circuit 200 includes a phase-locked loop 202, a phase interpolator 204, and a phase controller 206. The circuit 200 generates the output clock signal on line 208 having an output frequency that matches the input frequency of the input clock signal on line 210. In one embodiment, the output frequency matches the input frequency because the output and input frequencies are equal. In another embodiment, the input and output frequencies match because the output frequency is the input frequency multiplied by a factor that is a ratio of one integer over another integer. In yet another embodiment, the input and output frequencies match because the output frequency equals an effective input rate derived from the input frequency as discussed below.

The phase-locked loop 202 receives the reference clock signal on line 212. In the illustrated embodiment, the phase-locked loop 202 generates two reference phases on lines 214 and 216 from the reference clock signal on line 212. The reference phases on lines 214 and 216 have the reference frequency, and the reference phases on lines 214 and 216 are differential signals that differ in phase by pi radians. It will be appreciated that the phase-locked loop 202 generates a single reference clock signal or more than two reference phases in other embodiments.

Divider 218 divides the frequency of the reference clock signal on line 212 by an integer M that could be unity. Similarly, divider 220 divides the reference frequency of a reference phase on line 214 by an integer N that could be unity. In one embodiment, divider 218 is a counter that outputs a pulse after counting every block of M cycles of the reference clock signal on line 212, and divider 220 is a similar counter counting every block of N cycles of the reference phase on line 214.

Phase detector 222 detects the difference in phase between the reference clock signal on line 212 divided by M and the reference phase on line 214 divided by N. When the inputs to the phase detector 222 are aligned, the division of the reference phase on line 214 by N is phase and frequency locked to the division of the reference clock signal on line 212 by M. Thus, the reference frequency of the reference phase on line 214 equals the frequency of the reference clock signal on line 212 times the ratio of integer N over integer M. When the inputs to the phase detector 222 are aligned, the frequencies of its two inputs are identical and equal the synchronization frequency at which the phase detector 222 rechecks alignment. Thus, the synchronization frequency equals both the frequency of the reference clock signal on line 212 divided by M and the reference frequency of reference phase on line 214 divided by N. When the inputs to the phase detector 222 are not aligned, the phase detector 222 indirectly controls the voltage-controlled oscillator 224 to change the reference frequency to bring the inputs of the phase detector 222 into alignment.

When the phase angle of the division of the reference phase on line 214 by N leads the phase angle of the division of the reference clock signal on line 212 by M, the phase detector 222 controls charge pump 226 to decrease the reference frequency of the reference phases on lines 214 and 216. When the phase angle of the division of the reference phase on line 214 by N lags the phase angle of the division of the reference clock signal on line 212 by M, the phase detector 222 controls charge pump 226 to increase the reference frequency of the reference phases on lines 214 and 216. In one embodiment, to increase the reference frequency the phase detector 222 causes charge pump 226 to inject charge into a capacitance of low-pass filter 228, and to decrease the reference frequency the phase detector 222 causes charge pump 226 to remove charge from the capacitance of low-pass filter 228. The low-pass filter 228 is the capacitance in parallel with a resistance in this embodiment, and the cut-off frequency of the low-pass filter is the inverse of the RC time constant for the capacitance and the resistance. In this embodiment, the voltage-controlled oscillator 224 increases the reference frequency of the reference phases on lines 214 and 216 as the filtered voltage output from low-pass filter 228 increases, and the voltage-controlled oscillator 224 decreases the reference frequency as the filtered voltage decreases.

In the illustrated embodiment, the phase interpolator 204 includes a ring interpolator 230 that generates multiple reference phases on lines 232 from the two reference phases on lines 214 and 216. In another embodiment, the ring interpolator 230 generates multiple reference phases on lines 232 from a single reference phase generated by a crystal oscillator, a phase-locked loop, or another source. In yet another embodiment, the phase interpolator 204 omits a ring interpolator because the phase-locked loop 202 directly generates a sufficient number of reference phases 232. In one example, the number of reference phases on lines 232 is eight reference phases with relative phase offsets that are multiples of pi over four radians.

Multiplexor 234 selects two reference phases on lines 236 and 238 from the reference phases on lines 232, and the current value of the control register 240 controls this selection. Multiplexor 234 generally selects two of the reference phases on lines 232 having adjacent phase offsets, and these adjacent phase offsets specify a coarse selection of the phase angle of the output clock signal on line 208. In an embodiment with eight reference phases on lines 232, multiplexor 234 includes an even multiplexor for selecting the reference phase on line 236 from four reference phases on lines 232 having relative phase offsets that are multiples of pi over two radians, and multiplexor 234 includes an odd multiplexor for selecting the reference phase on line 238 from the other four reference phases.

Weighted interpolator 242 generates the output clock signal on line 208 that is a weighted combination the two selected reference phases on lines 236 and 238, and the current value of the control register 240 controls the weights of the combination.

In one embodiment, each combination combines one of thirty-two possible weights of the reference phase on line 236 and another of the thirty-two possible weights of the reference phase on line 238. In this embodiment, the output clock signal on line 208 is weight W[i] times the reference phase on line 238 plus weight W[31–i] times the reference phase on line 236, for index i from zero to thirty-one. To a first approximation, weight W[i] is proportional to i/31 however, the weights are adjusted to maintain a constant amplitude for the output clock signal on line 208. In one example, the channel widths of selectively enabled transistors provide the weights, and the weighted interpolator 242 selectively enables the transistors as a function of the current value of variable control register 240. The output clock signal on line 208 is generated from only the reference phase on line 236 for index i equaling zero, and the output clock signal on line 208 is generated from only the reference phase on line 238 for index i equaling thirty-one. Because the variable control register 240 selects the reference phases on lines 236 and 238 and selects the weights of the interpolation between these selected reference phases, the variable control register 240 selects one of 248 possible phase angles for the output clock signal on line 208.

If the control register 240 has a constant value, then the output frequency of the output clock signal on line 208 equals the reference frequency generated from reference clock signal 212, and the output clock signal on line 208 has a phase angle specified by the constant value of the control register 240.

In contrast, if the control register 240 has a variable value, the phase angle of the output clock signal on line 208 varies with the varying value of the control register 240. If the value of the control register 240 increases monotonically and linearly, then the phase angle of the output clock signal on line 208 rotates relative to the phase angle of the reference clock signal 212, and this phase rotation increases the output frequency of the output clock signal on line 208 by the rate of change of this phase rotation. Similarly, if the value of the control register 240 decreases monotonically and linearly, then the output frequency of the output clock signal on line 208 is the reference frequency plus the negative phase rotation rate.

In one embodiment, the phase controller 206 iteratively or periodically updates the value of variable control register 240. The rate of change of the variable control register 240 provides a phase rotation rate. If the phase rotation rate is positive, the phase interpolator 204 monotonically increases the phase angle of the output clock signal on line 208 relative to the phase angle of the reference clock signal on line 212, and the phase angle of the output clock signal on line 208 monotonically increases at the phase rotation rate. This generates the output clock signal on line 208 having an output frequency higher than the reference frequency of the reference phases on lines 214 and 216. If the phase rotation rate is negative, the phase interpolator 204 monotonically decreases the phase angle of the output clock signal on line 208 and the phase interpolator 204 generates the output clock signal on line 208 having the output frequency that is lower than the reference frequency. In general, the output frequency of the output clock signal on line 208 equals a sum of the phase rotation rate and the reference frequency of the reference phases on lines 214 and 216.

In one embodiment, the phase controller 206 generates the variable value for control register 240 from a filtering of an integration of a phase and frequency difference between the output clock signal on line 208 divided by integer P, and the input clock signal on line 210 divided by integer Q. Divider 244 divides the output frequency of the output clock signal on line 208 by an integer P that could be unity. Similarly, divider 246 divides the input frequency of input clock signal on line 210 by an integer Q that could be unity. The phase-frequency detector 248 causes its inputs to become aligned, such that the division of the output frequency of the output clock signal on line 208 by P equals the division of the input frequency of the input clock signal on line 210 by Q. The phase-frequency detector 248 determines a respective indicator value for each active transition of the output clock signal on line 208, with the respective indicator value indicating a phase and frequency difference between the output clock signal on line 208 and the input clock signal on line 210. The integration circuit 250 adds the respective indicator value for each active transition to a running total. A digital low-pass filter 252 filters the running total and updates the variable control value with the filtered result for each active transition.

An important benefit is that much of the phase controller 206 can operate at a lower frequency than the input or output clock signals on lines 210 and 208. Dividers 244 and 246 can reduce the frequency of the input or output clock signals on lines 210 and 208. To minimize jitter from the phase controller 206 updating variable control register 240, the phase controller 206 should update the variable control value to the next possible phase angle at a rate given by the number of possible quantized phase angles and the frequency difference between the input and output clock signals on lines 210 and 208. If the frequency difference between the input and output clock signals on lines 210 and 208 is small, the phase controller 206 can infrequently update the variable control register 240. Furthermore, the variable control register 240 can be an accumulator that periodically adds an increment amount, and because the increment amount is often nearly constant, the phase controller 206 can recalculate this increment amount at a rate that is much lower than the frequency difference between the input and output clock signals on lines 210 and 208.

Because the phase and frequency detector 248 can operate at a lower frequency than phase detector 222 of phase-locked loop 202, phase and frequency detector 248 can detect whether the input and output clock signals on lines 210 and 208 are matched in both phase and frequency. A phase and frequency detector is often an asynchronous circuit with feedback paths that limit the maximum operating frequency of the phase and frequency detector. The phase detector 222 may operate at too high a frequency to support any feedback paths, such that the phase detector 222 aligns only phases and might lock harmonic frequencies. In addition, the integration circuit 250 and the low-pass filter 252 can be digital circuits instead of the analog circuits of charge pump 226 and low-pass filter 228.

In one embodiment, the output jitter of the output clock signal on line 208 is less than an input jitter of the input clock signal on line 210. The output jitter includes a reference jitter and a quantization jitter. The reference jitter is the jitter of the reference clock signal on line 212 plus the jitter produced by phase-locked loop 202 and phase interpolator 204. The quantization jitter of the phase interpolator 204 is an inverse of the reference frequency of the reference phases on lines 214, 216, 232, 236, and 238 divided by a product of the number of the reference phases on lines 232 and the number of weighted combinations for the interpolation between the two reference phases on lines 236 and 238.

In one embodiment, a service indicator on line 254 qualifies the input clock signal on line 210. In one example, the input cycles of the input clock signal on line 210 are time division multiplexed between two services, such that groups of input cycles for one service alternate with groups of input cycles for the other service. Thus, the input cycles are split between the two services, and each service has an effective input rate. The sum of the effective input rates for the two services generally equals the input frequency of the input clock signal on line 210. In one example for determining the effective input rate of a selected one of the two services, the divider 246 is a counter with an enable input tied to the service indicator on line 254, and divider 246 counts input cycles of the input clock signal on line 210 for the selected service. This causes the output frequency of the output clock signal on line 208 to match the effective input rate of the selected service. It will be appreciated that the divider 246 gates input cycles of the selected service when Q equals one.

Figure 3:
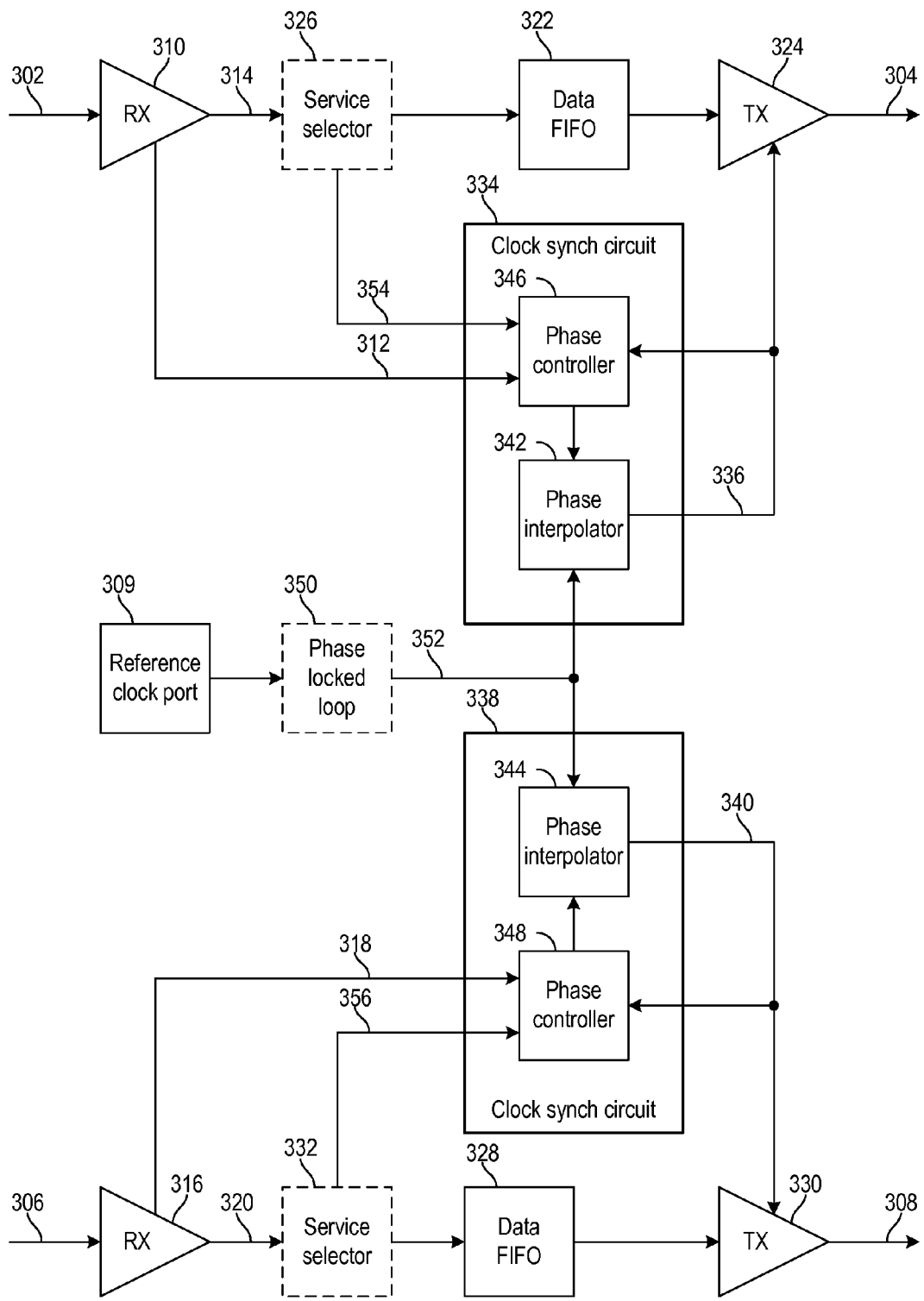
FIG. 3 is a block diagram of a data repeater.

FIG. 3 is a block diagram of a data repeater. The data repeater serially receives data at input port 302, and retimes and serially transmits the data from output port 304. The data repeater also serially receives data at input port 306, and retimes and serially transmits the data from output port 308. While the data rates for receiving data at input ports 302 and 306 may differ, the data repeater independently retimes the data from both input ports 302 and 306 using a single reference clock signal received at reference clock port 309.

A data repeater can recover an input clock and input data from a serial bit stream encoded in an 8B10B code, for example. If the data repeater recovers the input clock using a phase-locked loop and uses the recovered input clock as the output clock for transmitting the output data, the phase-locked loop adds jitter to the transmit clock. If data repeaters are cascaded, each repeater adds jitter and this limits the number of possible cascaded data repeaters. In addition, the cascaded phase-locked loops in the cascaded data repeaters might become unstable. A retiming data repeater eliminates these drawbacks because the output jitter is independent of the input jitter. One embodiment is a synchronized retiming data repeater that retimes while matching the output frequency for the output port 304 to input frequency or effective input rate for the input port 302, and independently matching the output frequency for the output port 308 to the input frequency or the effective input rate for the input port 306.

The data repeater includes a data receiver 310 that recovers an input clock signal on line 312 and a serial data bit sequence on line 314 from a communication link coupled to input port 302. The data repeater includes another data receiver 316 that recovers an input clock signal on line 318 and a serial data bit sequence on line 320. A data first-in first-out (FIFO) buffer 322 couples the data receiver 310 to a data transmitter 324 via an optional service selector 326. A FIFO buffer 328 couples the data receiver 316 to data transmitter 330 via optional service selector 332.

Clock synchronization circuit 334 generates an output clock signal on line 336 that is synchronized to the input clock signal on line 312. Similarly, clock synchronization circuit 338 generates an output clock signal on line 340 that is synchronized to the input clock signal on line 318. When the input clock signals on lines 312 and 318 have different frequency because they are generated from independent sources, clock synchronization circuits 334 and 338 independently synchronize the corresponding different frequencies of the output clock signals on lines 336 and 340.

Data transmitter 324 transmits the serial data bit sequence on line 314 on a communication link coupled to output port 304, and data transmitter 324 transmits the serial data bit sequence on line 314 synchronized to the output clock signal on line 336. Data transmitter 330 similarly transmits the serial data bit sequence on line 320 synchronized to the output clock signal on line 340.

Clock synchronization circuits 334 and 338 include respective phase interpolators 342 and 344 that operate similarly to the phase interpolator 204 of FIG. 2. Clock synchronization circuits 334 and 338 also include respective phase controllers 346 and 348 that operate similarly to the phase controllers 206 of FIG. 2.

In one embodiment, an optional phase-locked loop 350 is shared between clock synchronization circuits 334 and 338 and operates similarly to the phase-locked loop 202 of FIG. 2. Thus, the optional phase-locked loop 350 generates a second reference frequency of one or more reference phases on line 352, and the reference frequency from clock reference port 309 divided by a first integer equals the second reference frequency on line 352 divided by a second integer. Another embodiment omits optional phase-locked loop 350 and each clock synchronization circuit 334 and 338 includes a phase-locked loop operating similarly to the phase-locked loop 202 of FIG. 2. In yet another embodiment, the data repeater does not include any phase-locked loops.

In an embodiment including optional service selectors 326 and 332, service selector 326 associates groups of the serial data bit sequence on line 314 with corresponding services, and the service selector 326 indicates on line 354 whether the corresponding service for each group is a forwarded service. Service selector 332 similarly indicates on line 356 whether the corresponding service for each associated group of the serial data bit sequence on line 320 is a forwarded service. The serial data bit sequence on line 314 in each group associated with a forwarded service is forwarded through the data transmitter 324, and the serial data bit sequence on line 314 in groups not associated with the forwarded services are not forwarded through the data transmitter 324. In one example, the serial data bit sequence on line 314 are grouped into symbols and the symbols are striped in a weighted round-robin order among the available services, and some of these services are forwarded services. In another example, the serial data bit sequence on line 314 are grouped into frames tagged with a service indicator, and some of these services are forwarded services.

Phase controller 346 generates a variable control value providing a phase rotation rate that matches the output frequency of the output clock signal on line 336 to the input frequency occurring while the service selector 326 is indicating a forwarded service on line 354. Output cycles occur at the output frequency of the output clock signal on line 336, and input cycles occur at the input frequency of the input clock signal on line 312. A portion of these input cycles includes those input cycles that the data receiver 310 recovers together with a portion of the serial data bit sequence on line 314 that data transmitter 324 forwards. To match the output frequency of output clock signal on line 336 to the effective input rate of this forwarded portion of the input cycles, the phase controller 346 matches a running total of the output cycles of the output clock signal on line 336 to a running total of this forwarded portion of the input cycles on the input clock signal on line 312. Phase controller 348 similarly matches the output frequency of the output clock signal on line 340 to the effective input rate of the forwarded portion of the input cycles of the input clock signal on line 318.

The embodiments are thought to be applicable to a variety of systems for generating an output clock signal synchronized to an input clock signal. Other aspects and embodiments will be apparent to those skilled in the art from consideration of the specification. For example, the embodiments may be implemented as an application specific integrated circuit (ASIC) or as a logic on a programmable logic device. It is intended that the specification and illustrated embodiments be considered as examples only, with a true scope and spirit of the invention being indicated by the following claims.

What is claimed is:

1. A circuit for generating an output clock signal synchronized to an input clock signal, comprising:
   a reference clock port configured to receive a reference clock signal;
   a crystal oscillator coupled to the reference clock port and configured to generate the reference clock signal, the reference clock signal having a fixed crystal frequency;
   a phase-locked loop coupled to the reference clock port and configured to generate, from the reference clock signal, at least one reference phase having the reference frequency, and align a first division of the reference clock signal by a first integer and a second division of the at least one reference phase by a second integer;
   wherein the phase-locked loop is further configured to align the first and second divisions at a synchronization frequency that nominally equals the fixed crystal frequency divided by the first integer and the reference frequency divided by the second integer;
   a phase interpolator coupled to the reference clock port and configured to generate the output clock signal that, as a function of a variable control value, is an interpolation between two of a plurality of reference phases;
   wherein the plurality of reference phases are generated from the at least one reference phase and from the reference clock signal and have a reference frequency; and
   a phase controller coupled to the phase interpolator and configured to generate the variable control value providing a phase rotation rate,
   wherein an output frequency of the output clock signal equals a sum of the reference frequency and the phase rotation rate; and
   wherein the output frequency matches an input frequency of the input clock signal.

2. The circuit of claim 1, wherein the crystal oscillator is configured to generate the reference clock signal having the reference frequency.

3. The circuit of claim 1, wherein:
   the phase interpolator is configured to generate the plurality of reference phases that are eight reference phases;
   the phase interpolator is configured to generate the output clock signal that is one of thirty-two weighted combinations of a first and a second reference phase of the two of the eight reference phases, each of the thirty-two weighted combinations combining one of thirty-two weights of the first reference phase and another of the thirty-two weights of the second reference phase;
   the phase interpolator is configured to select the two of the eight reference phases as a function of the variable control value; and
   the phase interpolator is configured to select the one of the thirty-two weighted combinations as a function of the variable control value.

4. The circuit of claim 1, wherein:
   the phase controller is configured to iteratively update the variable control value that provides the phase rotation rate;
   in response to the phase rotation rate being positive:
      the phase interpolator is configured to generate the output clock signal having the output frequency higher than the reference frequency;
      the phase interpolator is configured to monotonically increase a phase angle of the output clock signal relative to a phase angle of the reference clock signal; and
      the phase angle of the output clock signal monotonically increases at the phase rotation rate relative to the phase angle of the reference clock signal; and
   in response to the phase rotation rate being negative:
      the phase interpolator is configured to generate the output clock signal having the output frequency lower than the reference frequency;
      the phase interpolator is configured to monotonically decrease the phase angle of the output clock signal relative to the phase angle of the reference clock signal; and
      the phase angle of the output clock signal monotonically decreases at the phase rotation rate relative to the phase angle of the reference clock signal.

5. The circuit of claim 1, wherein the phase controller is configured to periodically update the variable control value.

6. The circuit of claim 1, wherein the phase controller includes:
   a phase frequency detector configured to determine a respective indicator value for each of a plurality active transitions generated from the output clock signal, the respective indicator value indicating a phase and frequency difference between the output clock signal and the input clock signal;
   an integration circuit coupled to the phase frequency detector and configured to add, at each of the plurality of active transitions, the respective indicator value to a running total; and
   a digital low-pass filter coupled to the integration circuit and configured to update, at each of the plurality of active transitions, the variable control value with a result from a low-pass filtering of the running total.

7. The circuit of claim 1, wherein:
   an output jitter of the output clock signal is less than an input jitter of the input clock signal;
   the output jitter includes a reference jitter of the reference clock signal and a quantization jitter of the phase interpolator; and
   the quantization jitter is an inverse of the reference frequency divided by a product of a number of the plurality of reference phases and a number of weighted combinations for the interpolation between the two of the plurality of reference phases.

8. A circuit for clock synchronization, comprising:
   a reference clock port configured to receive a reference clock signal, wherein the reference clock signal has a first reference frequency, and the first reference frequency divided by a first integer equals a second reference frequency divided by a second integer; and
   a plurality of clock synchronization circuits for generating a plurality of respective output clock signals synchronized to a plurality of respective input clock signals, wherein each clock synchronization circuit includes:
      a phase interpolator coupled to the reference clock port and configured to generate the output clock signal that, as a function of a variable control value, is an interpolation between two of a plurality of reference phases;
      wherein the plurality of reference phases are generated from the reference clock signal and have the second reference frequency; and
      a phase controller coupled to the phase interpolator and configured to generate the variable control value providing a phase rotation rate,
      wherein an output frequency of the respective output clock signal equals a sum of the second reference frequency and the phase rotation rate, and the output frequency matches an input frequency of the respective input clock signal.

9. The circuit of claim 8, wherein:
the plurality of respective input clock signals is generated independently and has a plurality of different frequencies; and
the output frequency of the respective output clock signal for each clock synchronization circuit matches the different frequency that is the input frequency of the respective input clock signal for the clock synchronization circuit.

10. The circuit of claim 8, wherein:
each clock synchronization circuit further includes a phase-locked loop coupled between the reference clock port and the phase interpolator of the clock synchronization circuit; and
the phase-locked loop is configured to generate, from the reference clock signal, the plurality of reference phases of the phase interpolator.

11. The circuit of claim 8, further including a single phase-locked loop coupled to the reference clock port and the phase interpolator of each of the plurality of clock synchronization circuits, wherein:
the single phase-locked loop is configured to generate another plurality of reference phases from the reference clock signal; and
the phase interpolator of each of the plurality of clock synchronization circuits is configured to generate the plurality of reference phases of the phase interpolator from the another plurality of reference phases.

12. The circuit of claim 8, wherein for each clock synchronization circuit:
the phase controller of the clock synchronization circuit is configured to iteratively update the variable control value of the phase interpolator of the clock synchronization circuit; and
the phase controller is configured to iteratively update the variable control value from a filtering of an integration of a difference between the respective output clock signal divided by a third integer and the respective input clock signal divided by a fourth integer.

13. A data repeater circuit, comprising:
a data receiver configured to recover an input clock signal and a serial sequence of data bits received from a first communication link;
a reference clock port configured to receive a reference clock signal;
a phase interpolator coupled to the reference clock port and configured to generate an output clock signal that, as a function of a variable control value, is an interpolation between two of a plurality of reference phases, wherein the plurality of reference phases are generated from the reference clock signal and have a reference frequency;
wherein an output jitter of the output clock signal is less than an input jitter of the input clock signal, the output jitter includes a reference jitter of the reference clock signal and a quantization jitter of the phase interpolator, and the quantization jitter is an inverse of the reference frequency divided by a product of a number of the plurality of reference phases and a number of weighted combinations for the interpolation between the two of the plurality of reference phases;
a phase controller coupled to the data receiver and the phase interpolator, the phase controller configured to generate the variable control value providing a phase rotation rate, wherein an output frequency of the output clock signal equals a sum of the reference frequency and the phase rotation rate, and the output frequency matches an input frequency of the input clock signal; and
a data transmitter coupled to the data receiver and the phase interpolator, the data transmitter being configured to transmit the serial sequence of data bits on a second communication link, the data transmitter further being configured to transmit the serial sequence of data bits synchronized to the output clock signal.

14. The data repeater circuit of claim 13, further comprising:
a service selector coupled to the data receiver and the phase controller, the service selector associating each of a plurality of groups of the serial sequence of data bits with a corresponding service, and the service selector indicating whether the corresponding service for each group is one of at least one forwarded service, and
wherein the phase controller is configured to generate the variable control value providing the phase rotation rate that matches the output frequency to the input frequency occurring during each group that is forwarded through the data transmitter, including matching a running total of a plurality of output cycles of the output clock signal to a running total of a portion of a plurality of input cycles of the input clock signal;
wherein the plurality of output cycles occur at the output frequency of the output clock signal, and the plurality of input cycles occur at the input frequency of the input clock signal that the data receiver recovers together with the serial sequence of data bits; and
wherein the portion of the plurality of input cycles is those of the plurality of input cycles that the data receiver recovers together with the serial sequence of data bits that are in those of the plurality of groups that have the corresponding service that is in the at least one forwarded service.

15. The data repeater circuit of claim 13, further comprising a phase-locked loop coupled between the reference clock port and the phase interpolator, the phase-locked loop being configured to generate another plurality of reference phases from the reference clock signal, wherein:
the phase interpolator is configured to generate the plurality of reference phases from the another plurality of reference phases; and
the phase controller is configured to iteratively update the variable control value from a filtering of an integration of a difference between the output clock signal divided by a first integer and the input clock signal divided by a second integer.

* * * * *